June 26, 1956

M. MENNESSON 2,751,991

MOUNTING OF BICYCLE FRONT WHEEL AND
AUXILIARY DRIVE ENGINE THEREFOR

Filed Aug. 21, 1953

INVENTOR
MARCEL MENNESSON

BY
Bailey, Stephens + Huettig
ATTORNEYS

June 26, 1956

M. MENNESSON 2,751,991

MOUNTING OF BICYCLE FRONT WHEEL AND
AUXILIARY DRIVE ENGINE THEREFOR

Filed Aug. 21, 1953

INVENTOR
Marcel Mennesson
BY
ATTORNEYS

United States Patent Office 2,751,991
Patented June 26, 1956

2,751,991

MOUNTING OF BICYCLE FRONT WHEEL AND AUXILIARY DRIVE ENGINE THEREFOR

Marcel Mennesson, Neuilly-sur-Seine, France, assignor to Societe d'Appareils de Controle et d'Equipment des Moteurs (S. A. C. E. M.), Neuilly-sur-Seine, France, a society of France Application August 21, 1953, Serial No. 375,784

Claims priority, application France October 1, 1952

2 Claims. (Cl. 180—31)

The present invention relates to light vehicles at least one wheel of which is driven by at least one driving roller running in contact with the tire of said wheel. My invention is more especially although not exclusively concerned with bicycles having an auxiliary engine and more especially with bicycles of this kind in which the wheel which is thus driven is the front wheel, and the engine is carried by the front fork.

The object of my invention is to provide a vehicle of this kind which is better adapted to meet the requirements of practice than those existing at the present time.

According to my invention, the driving wheel of the vehicle is connected with the frame thereof in such manner that said wheel can have upward and downward displacements with respect to said frame and the driving roller is mounted with its axis substantially in the same vertical plane as the axle of said driving wheel so as to act as an abutment for the tire of said wheel during the upward displacements thereof, whereby the elasticity of said tire contributes in the elastic suspension of said wheel.

A preferred embodiment of the present invention will be hereinafter described with reference to the accompanying drawings, given merely by way of example, and in which.

Figure 1:
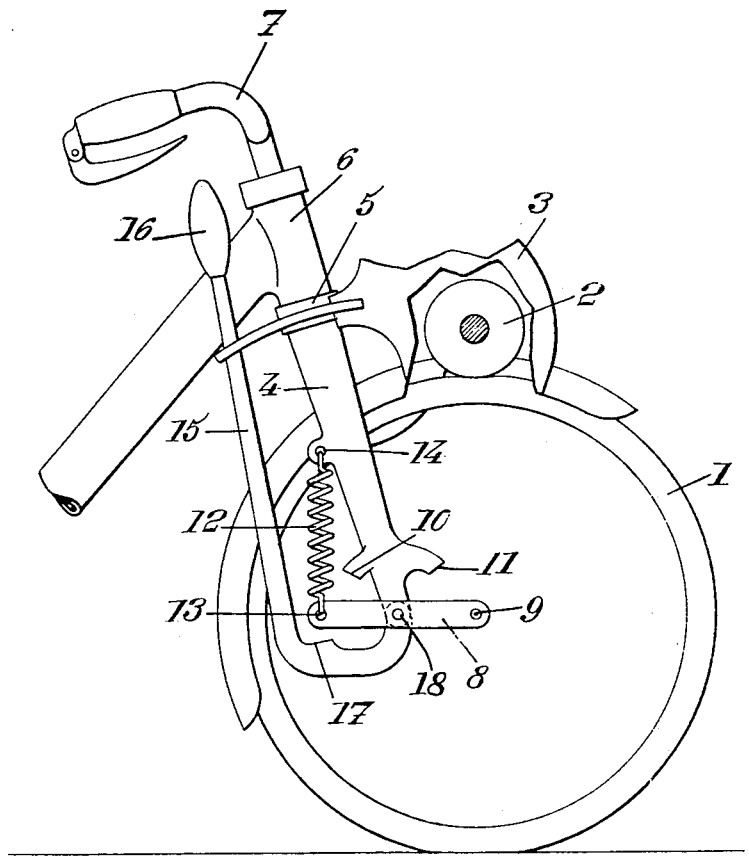
Fig. 1 shows in diagrammatic side view with parts in section the front portion of an auxiliary engine bicycle made according to my invention.
Figure 2:
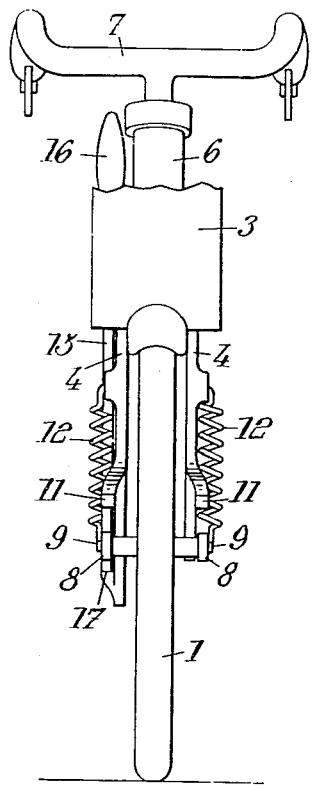
Fig. 2 is a front view of this bicycle, with parts broken away.

The bicycle shown by the drawing includes a front driving wheel 1 which is driven by a roller 2 actuated by a motor or engine 3 (broken away in Fig. 2) supported by the front fork 4 of a bicycle.

Said front fork is connected both with wheel 1 and with the frame of the vehicle in such manner that said wheel can move upwardly and downwardly with respect to the frame.

For this purpose, as shown by the drawing, the fork proper is constituted by two arms connected together at their upper part by a fork head 5, said head extending upwardly to constitute a steering tube journalled in the usual oblique tube 6 of the frame. The handle bar 7 is fixed to said steering tube.

At the lower ends of said fork arms, two levers 8 are pivoted about a horizontal axis 18, and the axle 9 of the front wheel of the bicycle is carried by the front ends of said levers 8.

According to my invention, roller 2 is disposed with its axis substantially in the same vertical plane as said axle 9.

Thus, when wheel 1 is resting on the ground, it tends to move upwardly with respect to the frame until its tire comes into contact with roller 2 which acts as an abutment for said tire. The tire is flattened by roller 2, the more so as the load is higher. I thus obtain a resilient suspension effect which substantially increases comfort.

Furthermore it will be found that, account being taken of the usual dimensions of the parts and of the pressure with which the pneumatic tires of light vehicles are inflated, in particular in the case of auxiliary engine bicycles, and also of the normal sizes of driving rollers, the positioning of said roller substantially above the axle of the driving wheel is particularly well adapted for obtaining an elastic suspension of advantageous amplitude and flexibility.

Advantageously I provide on fork 4 two abutments 10 and 11 to limit in both directions the angular displacements of levers 8, either in the case of a violent shock, or when the pneumatic tire is deflated.

A system as above described has in itself serious advantages but it is interesting to complete it by the adjunction of a resilient suspension system capable of cooperating with the resilient suspension of the bicycle, the characteristics of this elastic system being chosen such that when the load of the vehicle is reduced by the fact that the driver thereof dismounts there is a relative upward movement of the driving roller with respect to the wheel such that these two elements are no longer in contact with each other, whereby the engine is no longer connected with the driving wheel.

Said elastic system is advantageously constituted by a pair of coil springs 12 suitably interposed between fixation points 13 carried by levers 8 and fixation points 14 carried by the fork.

Furthermore, I may provide a mechanism for making it possible to disconnect these elements at will, even when the driver remains on the vehicle.

This mechanism is for instance constituted by a lever 15 carrying a handle 16 which is within reach of the driver, said lever being pivoted to the front fork 4 about the same axis 18 as levers 8 and being provided with an abutment 17 capable, when said lever is moved toward the disconnecting position, of pivoting levers 8 in a direction and with an amplitude such that disconnection is obtained.

Of course I might use a plurality of rollers for driving the same wheel.

I might also, for instance in the case of a tricycle, have several wheels driven by corresponding rollers.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A bicycle which comprises, in combination, a frame, a front fork pivoted in said frame, a front wheel, a tire mounted on said wheel, two parallel levers pivoted at their front ends about the axle of said wheel, one on each side thereof, said levers having their intermediate portions pivoted to the branches of said fork respectively about a horizontal axis parallel to the axle of said wheel, a motor carried by said fork, a roller driven by said motor and also carried by said fork to cooperate with the tire of said wheel for driving it, said roller having its axis located substantially in the same vertical plane as the axle of said wheel whereby said roller forms an abutment for said tire during the upward displacements of said wheel with respect to said frame, and springs interposed between the rear ends of said levers and said frame for resiliently suspending said frame with respect to said wheel, said springs being of such predetermined strength to move said roller out of contact with said tire when the cyclist gets off said bicycle.

2. A bicycle according to claim 1 further comprising manual lever means pivoted to one of said fork branches about the same axis as said parallel rollers and an abutment on said lever means to cooperate with the rear end of one of said parallel levers for moving said frame upwardly with respect to said wheel whereby said roller is out of contact with said tire.

References Cited in the file of this patent

UNITED STATES PATENTS

| | | |
|---|---|---|
| 676,409 | Berger | June 18, 1901 |
| 1,369,015 | Evans | Feb. 22, 1921 |
| 2,334,364 | Vavrik | Nov. 16, 1943 |

FOREIGN PATENTS

| | | |
|---|---|---|
| 242,396 | Germany | Jan. 9, 1912 |
| 176,514 | Great Britain | Mar. 8, 1922 |
| 218,558 | Switzerland | Apr. 1, 1942 |